US007992640B2

(12) United States Patent
Huang et al.

(10) Patent No.: US 7,992,640 B2
(45) Date of Patent: Aug. 9, 2011

(54) ORGANIC ACID TREATING FLUIDS WITH VISCOELASTIC SURFACTANTS AND INTERNAL BREAKERS

(75) Inventors: Tianping Huang, Spring, TX (US); James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 1234 days.

(21) Appl. No.: 11/626,163

(22) Filed: Jan. 23, 2007

(65) Prior Publication Data
US 2010/0252266 A1  Oct. 7, 2010

(51) Int. Cl.
  *E21B 43/27* (2006.01)
  *C09K 8/72* (2006.01)
  *C09K 8/74* (2006.01)
(52) U.S. Cl. ........ 166/281; 166/282; 166/300; 166/307; 507/203; 507/245; 507/260; 507/265; 507/921
(58) Field of Classification Search .................. None
See application file for complete search history.

(56) References Cited

U.S. PATENT DOCUMENTS

| | | | |
|---|---|---|---|
| 5,964,295 A | 10/1999 | Brown et al. | |
| 6,805,198 B2 | 10/2004 | Huang et al. | |
| 6,881,709 B2 | 4/2005 | Nelson et al. | |
| 7,060,661 B2 | 6/2006 | Dobson, Sr. et al. | |
| 7,115,546 B2 | 10/2006 | Qu et al. | |
| 7,119,050 B2 | 10/2006 | Chang et al. | |
| 7,527,102 B2 * | 5/2009 | Crews et al. ............... | 166/307 |
| 2002/0147114 A1 * | 10/2002 | Dobson et al. ............. | 507/242 |
| 2003/0119680 A1 * | 6/2003 | Chang et al. ............... | 507/200 |
| 2004/0152604 A1 * | 8/2004 | Qu et al. .................... | 507/200 |
| 2006/0211776 A1 * | 9/2006 | Crews ......................... | 516/194 |
| 2007/0056737 A1 * | 3/2007 | Crews et al. ............... | 166/300 |

OTHER PUBLICATIONS

B.R. Stewart, et al., "Use of a Solids-free Viscous Carrying Fluid in Fracturing Applications: An Economic and Productivity Comparison in Shallow Completions," SPE 30114, European Formation Damage Control Conference, May 15-16, 1995, pp. 379-392, The Hague, Netherlands.

J.E. Brown, et al., "Use of a Viscoelastic Carrier Fluid in Frac-Pack Applications," SPE 31114, SPE Formation Damage Symposium, Feb. 14-15, 1996, pp. 439-448, Lafayette, LA.

Exxonmobile Chemical, "Hydrocarbon Fluids: EXXSOL D 80 Fluid," 2000.

(Continued)

*Primary Examiner* — George Suchfield
(74) *Attorney, Agent, or Firm* — Mossman Kumar & Tyler PC

(57) ABSTRACT

An aqueous fluid system that contains an aqueous dicarboxylic acid solution, a viscoelastic surfactant as a gelling agent to increase the viscosity of the fluid, and an internal breaker such as mineral oil and/or fish oil to controllably break the viscosity of the fluid provides a self-diverting acid treatment of subterranean formations. The internal breaker may be at least one mineral oil, a polyalphaolefin oil, a saturated fatty acid, and/or is an unsaturated fatty acid. The VES gelling agent does not yield viscosity until the organic acid starts to spend. Full viscosity yield of the VES gelling agent typically occurs at about 6.0 pH. The internal breaker allows the VES gelling agent to fully viscosify the spent organic acid at 6.0 pH and higher, but as the spent-acid VES gelled fluid reaching reservoir temperature, controllable break of the VES fluid viscosity over time can be achieved.

39 Claims, 8 Drawing Sheets

OTHER PUBLICATIONS

M. Samuel, et al., "Viscoelastic Surfactant Fracturing Fluids: Applications in Low Permeability Reservoirs," SPE 60322, 2000 SPE Rocky Mountain Regional/Low Permeability Reservoirs Symposium, Mar. 12-15, 2000, pp. 1-7, Denver, Colorado.

P.M. McElfresh, et al., "A Single Additive Non-ionic System for Frac Packing Offers Operators a Small Equipment Footprint and High Compatibility with Brines and Crude Oils," SPE 82245, SPE European Formation Damage Conference, May 13-14, 2003, pp. 1-11, The Hague, Netherlands.

Crompton, "Hydrobrite 200 PO White Mineral Oil," Product Brochure, Sep. 8, 2005, available at http://www.cromptoncorp./servlet.

Crompton, Product Search Results for "White Mineral Oil," Sep. 8, 2005, available at http://www.cromptoncorp./servlet.

Crompton, Related Product Search Results citing "Hydrobrite 200 PO White Mineral Oil" and "Hydrobrite 550 PO White Mineral Oil," Sep. 8, 2005, available at http://www.cromptoncorp./servlet.

H.A. Nasr-El-Din et al.; "Acid Fracturing of Deep Gas Wells Using a Surfactant-Based Acid: Long-Term Effects on Gas Production Rate," SPE 102469, 2006 SPE Annual Technical Conference and Exhibition, Sep. 24-27, 2006, San Antonio, Texas.

H.A. Nasr-El-Din et al.; "Lessons Learned and Guildelines for Matrix Acidizing With Viscoelastic Surfactant Diversion in Carbonate Formations," SPE 102468, 2006 SPE Annual Technical Conference and Exhibition, Sep. 24-27, 2006, San Antonio, Texas.

* cited by examiner

Viscosity of Spending HTO Acid With & Without Breaker
Base Fluid: 10% HTO acid + 4% VES Viscosity of Spent HTO Acid With & Without Breaker at 140°F (60°C)

Viscosity Reduction of Spent HTO Acid by Internal Breaker at 160 °F (71 °C) with shear rate 100 1/s Viscosity Reduction of Spent HTO Acid by different Internal Breaker at 160 °F (71 °C) with shear rate 100 1/s 400 mesh (38 micron) stainless steel screens after pumping 1000 ml 10% HTO acid at 10 ml/min and 121 °C (250 °F)

400 mesh (38 micron) stainless steel screen after pumping 1000 ml 10% acetic acid at 10 ml/min and 121 °C (250 °F)

US 7,992,640 B2

ORGANIC ACID TREATING FLUIDS WITH VISCOELASTIC SURFACTANTS AND INTERNAL BREAKERS

TECHNICAL FIELD

The present invention relates to aqueous gelled treatment fluids used during hydrocarbon recovery operations, and more particularly relates, in one embodiment, to aqueous treatment fluids containing an organic acid and viscoelastic surfactant gelling agents used in acid treatments of subterranean formations having internal components to "break" or reduce the viscosity of the gelled fluid after treatment.

TECHNICAL BACKGROUND

Hydrocarbons sometimes exist in a formation but cannot flow readily into the well because the formation has very low permeability. In order for hydrocarbons to travel from the formation to the wellbore there must be a flow path from the formation to the wellbore. This flow path is through the formation rock and has pores of sufficient size and number to allow a conduit for the hydrocarbons to move through the formation. In some subterranean formations containing hydrocarbons, the flow paths are of low incidence or occurrence and/or size that efficient hydrocarbon recovery is hampered.

With respect to wells that previously produced satisfactorily, a common reason for a decline in oil and gas production from a particular formation is damage to the formation that plugs the rock pores and impedes the flow of oil to the wellbore and ultimately to the surface.

Well stimulation refers to the various techniques employed to improve the permeability of a hydrocarbon-bearing formation. Three general well-stimulation techniques are typically employed. The first involves injecting chemicals into the wellbore to react with and dissolve permeability damaging materials such as wellbore coatings, e.g. as may remain from previously used drilling fluids. A second method requires injecting chemicals through the wellbore and into the formation to react with and dissolve small portions of the formation thereby creating alternative flow paths for the hydrocarbons to flow to the wellbore. These alternative flow paths redirect the flow of hydrocarbons around the low permeability or damaged areas of the formation. A third technique, often referred to as fracturing, involves injecting chemicals into the formation at pressures sufficient to actually fracture the formation, thereby creating a large flow channel though which hydrocarbon can more readily move from the formation and into the wellbore.

Acidizing treatments of wells are a conventional process for increasing or restoring the permeability of subterranean formations so as to facilitate the flow of oil and gas from the formation into the well. The acid treatment is to remove formation damage along as much of the hydrocarbon flow path as possible, and/or to create new flow paths. An effective treatment should remove as much damage as possible along the entire flow path. This process involves treating the formation with an acid to dissolve fines and carbonate scale plugging or clogging the pores, thereby opening the pores and other flow channels and increasing the permeability of the formation. Continued pumping forces the acid into the formation, where it etches channels or wormholes. These channels provide ways for the formation hydrocarbons to enter the well bore.

Conventional acidizing fluids, such as hydrochloric acid or a mixture of hydrofluoric and hydrochloric acids, have high acid strength and quick reaction with fines and scale nearest the well bore, but have a tendency to corrode tubing, casing and down hole equipment, such as gravel pack screens and down hole pumps, especially at elevated temperatures. In addition, above 200° F. (92° C.), HCl is not recommended because of its destructive effect on some rock matrices. Due to the type of metallurgy, long acid contact times and high acid sensitivity of the formations, removal of the scale with hydrochloric acid and hydrochloric acid mixtures has been largely unsuccessful. There is a need to find an acid fluid system to dissolve the scale and remove the source of the fines through acidizing the surrounding formation and not damage the downhole equipment, particularly for high temperature wells.

The thickened acid fluids also have applications in hydraulic fracturing and in other well stimulation techniques known to one of ordinary skill in the art. Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons. When an acid is used in the fracturing fluid to increase or restore permeability to the formation, the treatment is term "acid fracturing" or "acid frac".

A successful acid treatment includes uniform placement of fresh acid fluids on the desired area. Chemical diverting agents attempt to temporarily block the high permeability interval or area and divert the fresh acid fluids into the desired low permeability or damaged intervals or areas. Conventional chemical diverters may be benzoic acid flakes, resins, and the like. More than two sequential stages composed of acid fluids followed by foamed or viscous acid diverter fluids have also been used to more uniformly distribute the fresh acid fluids in the hydrocarbon producing formation. Foamed diverter fluids are typically brines, such as 3% bw ammonium chloride brine, containing up to 2% by high-foaming surfactant and possibly other additives. Viscous diverter fluids are typically brines that contains polymer to thicken the brine, such as hydroxyethylcellulose (HEC). The use of diverting agents and diverter fluids has shown favorable results, however in many cases their efficiency in diverting acid can be poor and there can be problems cleaning-up the diverter from the treated reservoir. There is still a need for new methods for diverting acid fluids that are robust in performance and less problematic during cleanup.

Recently it has been discovered that aqueous drilling and treating fluids may be gelled or have their viscosity increased by the use of non-polymeric viscoelastic surfactants (VES). These VES materials are in many cases advantageous over the use of polymer gelling agents in that they are comprised of low molecular weight surfactants rather than high molecular polymers whereby polymer accumulations (e.g. polymeric filtercake) can be avoided. Viscoelastic type surfactants generate viscosity in aqueous fluids by forming unique elongated micelle arrangements. These unique arrangements have often been referred to as worm-like or rod-like micelles structures. However, VES gelled aqueous fluids may exhibit very high viscosity at very low shear rates and under static conditions. The exceptionally high viscosity, often in thousands of centipoise, can make the VES gelled fluid very difficult to initially move and displace from the pores and fractures of the formation. While the very high viscosity at very low shear rate may be good for diverting acid fluids, this in turn makes VES fluids hard to cleanup. The appearance of a VES gelled aqueous fluid at static to low shear conditions is shown in FIG. 1.

However, little progress has been made toward developing internal breaker systems for the non-polymeric VES-based gelled fluids. To this point, VES gelled fluids have relied only on "external" or "reservoir" conditions for viscosity reduction (breaking) and VES fluid removal (clean-up) during hydrocarbon production. Additionally, over the past decade it has been found that reservoir brine dilution has only a minor, if any, breaking effect of VES gel within the reservoir.

Instead, only one reservoir condition is primarily relied on for VES fluid viscosity reduction (gel breaking or thinning), and that has been the rearranging, disturbing, and/or disbanding of the VES worm-like micelle structure by contacting the hydrocarbons within the reservoir, more specifically contacting and mixing with crude oil and condensate hydrocarbons, as described in the U.S. Pat. No. 5,964,295. In one non-limiting embodiment, it is believed that the gel or increased viscosity is imparted to the aqueous fluid by the worm-like or rod-like micelles become entangled with one another, as illustrated in FIG. 2, where 10 refers to the worm-like or rod-like micelles and 12 refers to the individual surfactant molecules where the polar head groups on the micelle surface are represented by the individual spheres and the hydrophobic tails are directed or oriented into the interior of the micelle.

However, in many gas wells and in cases of excessive displacement of crude oil hydrocarbons from the reservoir pores during a VES gel treatment, results have shown many instances where VES fluid in portions of the reservoir are not broken or are incompletely broken resulting in residual formation damage (hydrocarbon production impairment). Contacting and breaking the viscous micelle-based fluid by reservoir hydrocarbons in all parts of the reservoir is not always effective. One viable reason is the exceptionally high viscosity VES fluid can exhibit at very low shear rates and static conditions which makes the fluid difficult to move and remove from porous media (i.e. the pores of the reservoir). Hydrocarbon producing reservoirs typically have heterogeneous permeability, where VES fluid within the less permeable portions of the reservoir may be even more difficult to move and cleanup. The very high viscosity at very low shear rates can prevent uniform contacting and breaking of viscous VES fluid by the reservoir hydrocarbons. Channeling and by-passing of viscous VES fluid often occurs that results in impaired hydrocarbon production. In such cases post-treatment clean-up fluids composed of either aromatic hydrocarbons, alcohols, surfactants, mutual solvents, and/or other VES breaking additives have been pumped within the VES treated reservoir in order to try and break the VES fluid for removal. However, placement of clean-up fluids is problematic and normally only some sections of the reservoir interval are cleaned up, leaving the remaining sections with unbroken or poorly broken VES gelled fluid that impairs hydrocarbon production. Because of this phenomenon and other occasions where reliance on external factors or mechanisms has failed to clean-up the VES fluid from the reservoir during hydrocarbon production, or in cases where the external conditions are slow acting (instances where VES breaking and clean-up takes a long time, such as several days up to possibly months) to break and then produce the VES treatment fluid from the reservoir, and where post-treatment clean-up fluids (i.e. use of external VES breaking solutions) are inadequate in removing unbroken or poorly broken VES fluid from all sections of the hydrocarbon bearing portion of the reservoir, there has been an increasing and important industry need for VES fluids to have internal breakers. Desirable internal breakers that should be developed include breaker systems that use products that are incorporated within the VES-gelled fluid that are activated by downhole temperature that will allow a controlled rate of gel viscosity reduction over a rather short period of time of 1 to 16 hours or so, similar to gel break times common for conventional polymeric fluid systems.

A challenge has been that VES-gelled fluids are not comprised of polysaccharide polymers that are easily degraded by use of enzymes or oxidizers, but are comprised of surfactants that associate and form viscous rod- or worm-shaped micelle structures that exhibit very high apparent viscosity at very low fluid shear rates. Conventional enzymes and oxidizers have not been found to act and degrade the surfactant molecules or the viscous micelle structures they form. It is still desirable, however, to provide some mechanism that relies on and uses internal phase breaker products that will help assure complete viscosity break of VES-gelled fluids.

It would be desirable if a viscosity breaking system could be devised to break the viscosity of fracturing and other well treatment fluids gelled with and composed of viscoelastic surfactants, particularly break the viscosity completely and relatively quickly. It would also be advantageous if a composition and method could be devised to overcome some of the problems in the conventional acidizing methods and fluids.

SUMMARY

There is provided, in one form, a method for treating a subterranean formation that involves introducing organic acids with a viscoelastic surfactant fluid into a subterranean formation. The fluid system is a synergistic combination and includes at least one dicarboxylic acid, water, at least one viscoelastic surfactant (VES) in an amount that is effective to increase the viscosity of the water, and at least one internal breaker. The internal breaker may be one or more mineral oils, one or more hydrogenated polyalphaolefin oils, one or more saturated fatty acids, one or more unsaturated fatty acids and combinations thereof. The novel composition contains organic acid which will not allow the VES gelling agent to yield noticeable viscosity until the acid starts to spend and approach a fluid pH of 4.0, after the acid fluid having the VES reaches its highest viscosity as the acid further spends (e.g. reacts with basic materials in the formation, such as carbonate) and the fluid pH approaches 6.0. Additionally and synergistically, the internal breaker does not start to work (i.e. become activated) until the VES gelling agent yields viscosity in the spent acid fluid and the fluid temperature reaches the reservoir temperature.

In another non-limiting embodiment, the subterranean formation is a carbonate and is treated with the synergistic acid fluid system, such as injecting the fluid through a wellbore into the formation. The initial fresh acid system has water-like viscosity during mixing and pumping. When the fresh acid fluid system contacts and reacts with carbonate formation, the fresh acid system starts the process of losing its acidity, the fluid pH starts to increase, divalent salts are being formed (e.g. $Ca^{2+}$ and/or $Mg^{2+}$ in particular, and as non-limiting examples) and the fluid starts becoming viscous. As the viscosity increases at a local level, the fluid system starts to become self-diverting, and as the acid completely spends the resultant fluid becomes very viscous and then effectively diverts the trailing acid fluid. The following fresh acid will be diverted to other areas to stimulate the formation and this may be a continuous diverting process during acid injection. After treatment of the formation with the acid, the viscosity of the viscoelastic surfactant gelled spent acid fluid is reduced with the internal breaker. The fluid may then be easily and readily recovered from the well prior to production and recovery of hydrocarbons. The reliance on or need for reservoir hydrocarbons to clean-up the viscous spent acid fluid is not required. The internal breakers upon activation over time degrade the viscous spent acid fluid within the reservoir into an easily producible fluid.

In another embodiment, there is provided an acid-containing aqueous fluid that includes water, at least one viscoelastic surfactant (VES) in an amount that is effective to increase the viscosity of the water, at least one internal breaker and at least one dicarboxylic acid. The internal breaker may include, but is not necessarily limited to, mineral oils, hydrogenated polyalphaolefin oils, saturated fatty acids, unsaturated fatty acids, highly unsaturated fatty acid blends and combinations thereof.

DETAILED DESCRIPTION

Figure 1:
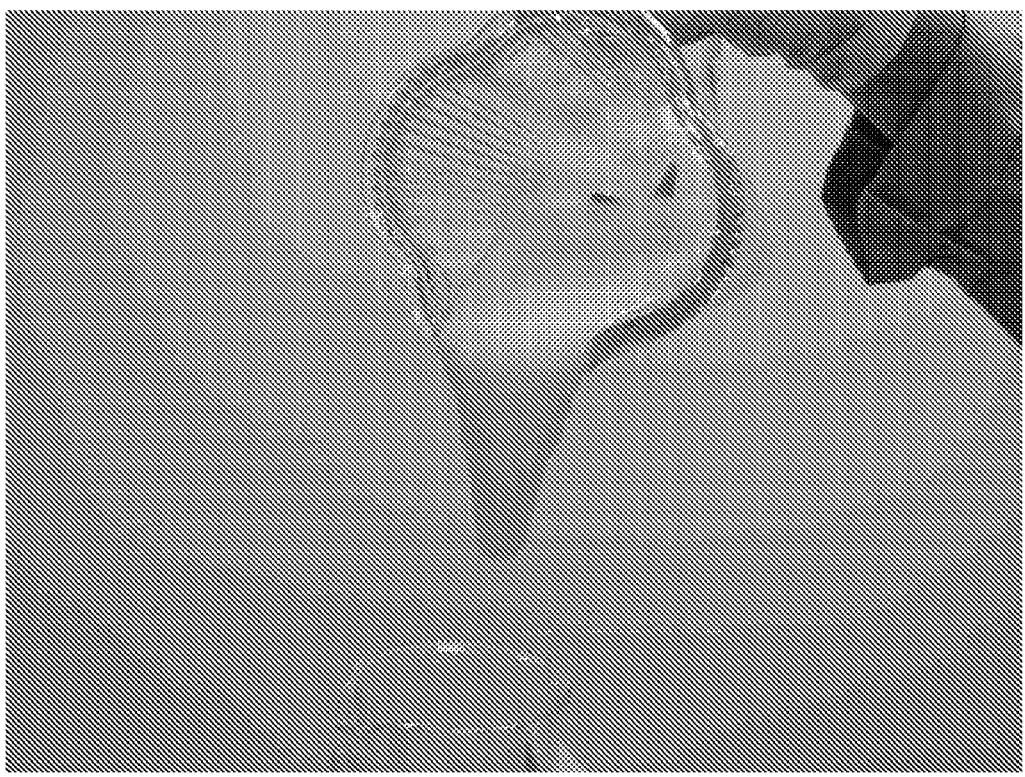
FIG. 1 is a photograph that shows how spent dicarboxylic acid (HTO™ acid) containing VES gelling agent exhibits very high viscosity at static and very low fluid shear rate conditions.
Figure 2:
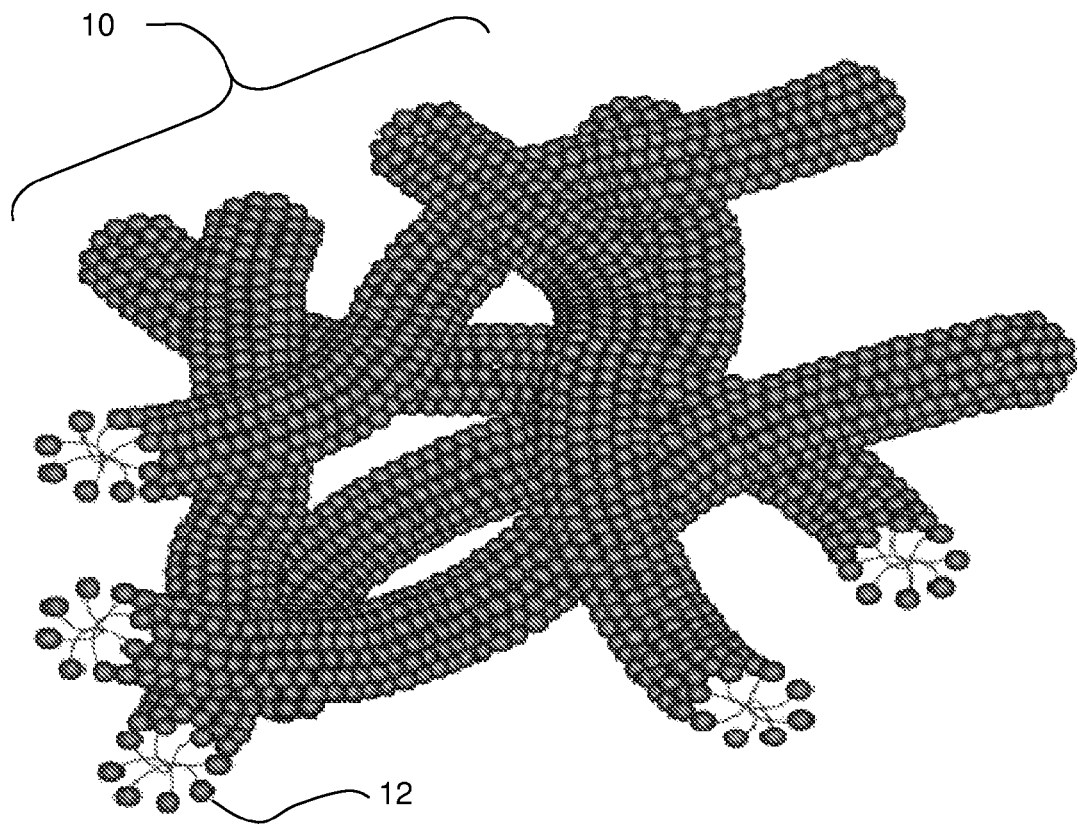
FIG. 2 is a schematic illustration of entanglement of rod-like VES micelles composed of VES molecules.

An organic acid-viscoelastic surfactant-internal breaker aqueous fluid system and method for matrix acidization and acid fracturing has been discovered for subterranean formations penetrated by a well bore, at temperatures in excess of about 100° F. to 400° F. (about 38° C. to 204° C.). These organic acid fluids may stimulate hydrocarbon carbonate formations with very low corrosion of tubular and downhole tools, screens and other equipment. In one non-limiting embodiment, the permeability of the subterranean formation is improved by a process including, but not necessarily limited to, etching channels, dissolving scale, removing fines, and combinations thereof. When these organic acids are initially mixed with viscoelastic surfactants (VESs) (e.g. amidoamine oxide) and relatively very low loading of internal breakers (e.g. mineral oil, fish oils, etc.) the fluid viscosity is very low, similar to water. A viscous gel starts to develop when the acid contacts and reacts with the carbonate in the subterranean formation. As the acid is spent, the pH of the fluid at that location increases and in turn the viscosity of the acid VES fluid increases. The viscoelastic surfactant gelled acid fluid (that contains the mineral oil and/or fish oil) maintains a higher viscosity to divert fresh acid to a new location to evenly place acid on rock surfaces during the continuation of the pumping process. After completion of the pumping treatment and shut-in of the well, the mineral oil and/or fish oil acts as an internal breaker to break the viscous gel, i.e. to lower the viscosity of the fluid. The internally broken acid-spent VES fluid is very easy to flow back with the producing fluid, leaving little or no damage to the formation. Very little reservoir pressure or time is required to produce and clean up the broken acid-spent VES fluid. No reliance on reservoir hydrocarbons is required to contact and clean up the acid-spent VES treatment fluid.

It has been found that a particularly useful organic acid fluid contains at least one water-soluble dicarboxylic acid. In one non-limiting embodiment herein, the dicarboxylic acid is of relatively low molecular weight, that is, has a formula weight of 175 or less. Suitable dicarboxylic acids therefore include, but are not necessarily limited to, oxalic acid (ethanedioic acid), malonic acid (propanedioic acid), succinic acid (butanedioic acid), glutaric acid (pentanedioic acid), adipic acid (hexanedioic acid), pimelic acid (heptanedioic acid), and mixtures thereof. In another, preferred embodiment of the invention, the dicarboxylic acids are selected from the group consisting of succinic acid, glutaric acid, adipic acid, and mixtures thereof. Interestingly, glutaric acid, succinic acid, and adipic acid have been used as components for corrosion inhibitors for ferrous metals, according to U.S. Pat. No. 4,512,552. Mixtures of succinic acid, glutaric acid, and adipic acid are generally available as a byproduct stream. More information may be found in U.S. Pat. No. 6,805,198 to Huang, et al. assigned to Baker Hughes Incorporated, and incorporated herein by reference in its entirety.

The organic acid fluid systems herein can effectively generate wormholes and flow paths to stimulate production in subterranean carbonate formations and dissolve carbonate scale. Further, these organic acids mixed with hydrofluoric acid can effectively remove fines to recover production in sandstone formations at elevated temperatures. These fluids have very low corrosion of the tubing, casing and down hole equipment.

Based on the properties of glutaric acid, succinic acid and adipic acid, this composition of dicarboxylic acids and other combinations of dicarboxylic acids (or single dicarboxylic acids used alone) can be used as acid compositions to stimulate high temperature wells, according to the methods herein. A series of tests done on screens and clay-rich cores show that this organic acid system, which is advantageously highly biodegradable, can successfully remove the calcium carbonate scale and fines to stimulate production. Core flood testing demonstrates that this organic acid system can effectively remove calcium carbonate scales and fines at temperatures up to 400° F. (204° C.). In addition to its reactivity, the acid system, when combined with corrosion inhibitor, exhibits very low corrosion at high temperatures. Corrosion tests show that at 350° F. (177° C.) the corrosion rate caused by this organic acid system is 0.001 lbs/ft$^2$ (0.005 kg/m$^2$) on 22-Cr for 16 hours. Acid soaking to completely remove scale prior to removal of fines is now possible at temperatures in excess of 100° F. (38° C.), and in particular 200° F. (92° C.). In one non-limiting embodiment of the invention, a preferred operating temperature range is between about 300° F. (149° C.) and about 350° F. (177° C.). Successive removal of plugging fines from screens can then proceed without further damage to the integrity of the screen.

Suitable solvents or diluents for the acid compositions herein include, but are not necessarily limited to, water, methanol, isopropyl alcohol, alcohol ethers, aromatic solvents, glycols, and mixtures thereof. In one non-limiting embodiment of the invention, the composition has an absence of monocarboxylic acids and/or an absence of tricarboxylic acids. Alternatively, in another embodiment of the invention, the acid composition has an absence of quaternary ammonium compounds and/or an absence of sulfur-containing corrosion inhibitor activator (e.g. thioglycolic acid, alkali metal sulfonate, etc.). As noted, a goal of the present invention is to avoid the use of strong mineral acids, such as HCl and/or $H_2SO_4$, so these acids should be absent from the acid composition in one preferred, alternate embodiment of the invention. The acid compositions of the present invention are intended to replace the mineral acid systems previously used, in one non-limiting aspect of the invention. The optional use of hydrofluoric acid (noted above) is an exception to these considerations about mineral acids.

As noted, aqueous fluids gelled with viscoelastic surfactants are typically used in wellbore completions, such as hydraulic fracturing, without the use of an internal breaker system, and typically rely on external downhole conditions for the VES-gelled fluid to break, such as dilution with reservoir brine and more importantly gel breaking through interaction with reservoir hydrocarbons during production of such reservoir fluids to the surface. However, reliance on external downhole conditions has showed instances where unbroken or poorly broken VES fluid remains within the reservoir after a VES fluid treatment and has impaired hydrocarbon production. There are aqueous fluids gelled with viscoelastic surfactants that are known to be "broken" or have their viscosities reduced, although some of the known breaking methods utilize external clean-up fluids as part of the treatment design (such as pre- and post-flush fluids placed within the reservoir before and after well completion treatments, such as conventional gravel packing and also "frac-packing"—hydraulic fracturing followed by gravel packing treatment). There are other known methods, but they are relatively slow—for instance the use of VES-gel breaking bacteria with fluid viscosity break times ranging from half a day up to 7 days. There has evolved in the stimulation fluid art an industry standard need for "quick gel break", but for VES-gelled fluids this has been a substantially challenging problem. There needs to be a method for breaking VES-gelled fluids that can be as easy, as quick, and as economic as breaking conventional crosslinked polymer fluids, preferably using an internal breaker. At the same time, it is not desirable to reduce the viscosity of the fluid, i.e. break the gel immediately or essentially instantaneously. Of considerable concern is the fact than an unbroken VES fluid has exceptionally high viscosity at very low shear rate and static conditions which makes it difficult for reservoir hydrocarbons to contact all of the VES fluid and to displace it from the pores of a treated reservoir. This is particularly true for gas reservoirs and crude oil reservoirs that have heterogeneous permeability with high relative permeability sections present.

A new method has been discovered to reduce the viscosity of aqueous fluids gelled with viscoelastic surfactants (i.e. surfactants that develop viscosity in aqueous brines, including chloride brines, by formation of rod- or worm-shaped micelle structures). The method removes the need or reliance on reservoir hydrocarbons to contact, break, and cleanup the viscoelastic fluid. The improvement will allow relatively very quick breaks, such as within 1 to about 16 hours, compared to the current technology of using bacteria to break VES which takes at least 48 or more hours, and more typically 4 to 7 days. In another non-limiting embodiment the break occurs within 1 to about 8 hours; alternatively from 1 to about 4 hours, and in another non-restrictive version 1 to about 2 hours. The breaker component herein can be used as an internal breaker, e.g. added to the gel after batch mixing of a VES-gel treatment, or added on-the-fly after continuous mixing of a VES-gel treatment using a liquid additive metering system in one non-limiting embodiment, or the components can be used separately, if needed, as an external breaker solution to remove VES gelled fluids already placed downhole. The dicarboxylic acids in the system herein generally keep the VES from gelling the aqueous fluid until the fluid reaches a carbonate formation that reacts with the acids and raises the local pH of the part of the fluid. When this happens, the fluid acts as a self-diverting acid stimulation fluid where the less viscous portions of the fluid are diverted to the carbonate formation that has not yet encountered the dicarboxylic acid.

Figure 3:
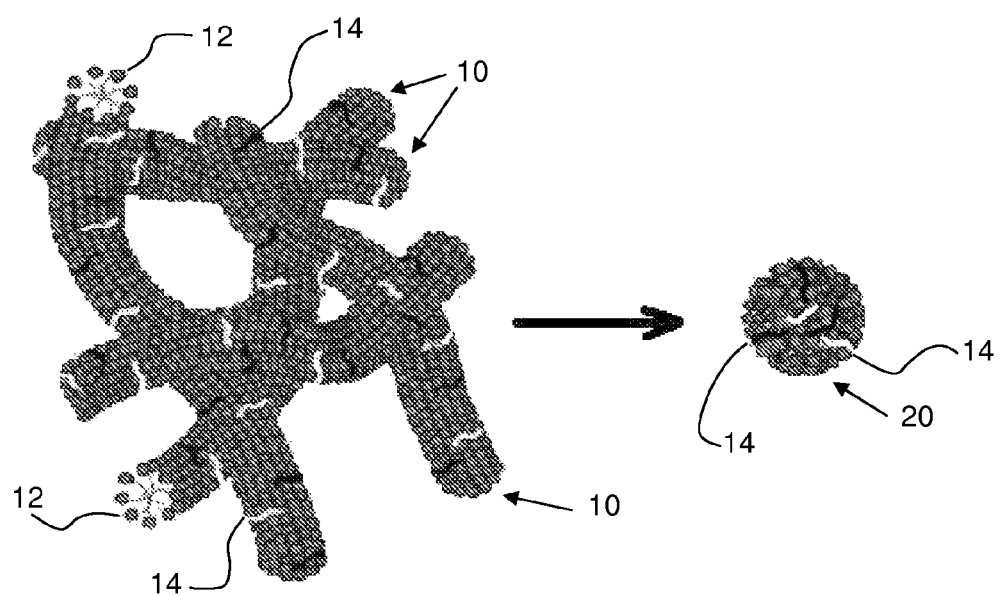
FIG. 3 is a schematic illustration of how polyenoic type internal breaker molecules may associate with VES micelles, and how upon auto-oxidation into by-products will alter the viscous rod-like micelle structures into non-viscous spherical shape micelle structures.

The internal breakers (e.g. mineral oils, hydrogenated polyalphaolefin oils, saturated fatty acids, polyunsaturated fatty acids, and the like) are not solubilized in the brine, since they are inherently hydrophobic, but rather interact with the VES surfactant worm-like micelle structures initially as dispersed microscopic oil droplets and thus form an oil-in-water type emulsion where the oil droplets are dispersed in the "internal phase" as a "discontinuous phase" of the brine medium/VES fluid which is the "outer phase" or "continuous phase". Additionally, it is possible for the internal breaker (e.g. unsaturated fatty acids) to be as individual compounds or molecules 14 associating with the hydrophobic tail portion of the VES molecules 12, and thereby be dispersed within the rod-like VES micelles 10, as schematically illustrated in FIG. 3. Laboratory tests have showed small amounts of unsaturated fatty acids, enough to eventually completely the break VES viscosity, will not spontaneously degrade VES viscosity upon individual association and dispersion within the VES micelles, but will become active to degrade VES viscosity upon activation, such as auto-oxidation of the fatty acids to by-products that disrupt the elongated, "rod-like" or "worm-like" micelles. In one non-limiting embodiment, the structure of the VES-molecules becomes spherical or "ball-like" as seen at 20 in FIG. 3, which spheres 20 do not associate with each other to increase the viscosity of the fluid in which they reside as do the "rod-like" or "worm-like" micelles.

Surprisingly and unexpectedly the method may employ one or more mineral oil (as a non-limiting example of a suitable breaker) as the breaking component. This is surprising because, as previously discussed, the literature teaches that contact of a VES-gelled fluid with hydrocarbons, such as those of the formation in a non-limiting example, essentially instantaneously reduces the viscosity of the gel or "breaks" the fluid. By "essentially instantaneously" is meant less than one-half hour. The rate of viscosity break for a given reservoir temperature by the methods described herein is controlled by type and amount of salts within the mix water (i.e. seawater, KCl, NaBr, CaCl$_2$, CaBr$_2$, NH$_4$Cl and the like), presence of a VES gel stabilizer (i.e. MgO, ZnO and the like), presence of a cosurfactant (i.e. sodium dodecyl sulfate, sodium dodecyl benzene sulfonate, potassium laurate, potassium oleate, sodium lauryl phosphate, and the like), VES type (i.e. amine oxide, quaternary ammonium salt, and the like), VES loading, the amount of mineral oil used, the distillation range of the mineral oil, its kinematic viscosity, the presence of components such as aromatic hydrocarbons, and the like.

It is not important to add the mineral oil after the VES is added to the aqueous fluid. That is, order of addition for the mineral oil, plant oil, fish oil, and the like is not important. Additionally, in the acid treating fluids herein, substantial gelling is not expected due to the presence of the dicarboxylic acid(s). The organic acids have been found, in unspent form, to not allow the VES gelling agent to yield viscosity, i.e. to prevent viscosity development. By "substantially gelled" herein is meant that at least 30% of the total viscosity increase has been achieved. In most cases, due to low fluid pH, less than 2% of the total VES viscosity will occur. However, it has been found that presence of internal breaker, including mineral oils, will not prevent the VES gelling agent from viscosifying the acid treatment fluid upon acid spending and fluid pH increasing. A novel and unique feature herein is how the internal breakers may be present during generation of VES viscosity but yet still act as VES viscosity breakers over time at reservoir temperature.

Mineral oil (also known as liquid petrolatum) is a by-product in the distillation of petroleum to produce gasoline. It is a chemically inert transparent colorless oil composed mainly of linear, branched, and cyclic alkanes (paraffins) of various molecular weights, related to white petrolatum. Mineral oil is produced in very large quantities, and is thus relatively inexpensive. Mineral oil products are typically highly refined, through distillation, hydrogenation, hydrotreating, and other refining processes, to have improved properties, and the type and amount of refining varies from product to product. Highly refined mineral oil is commonly used as a lubricant and a laxative, and with added fragrance is marketed as "baby oil" in the U.S. Most mineral oil products are very inert and non-toxic, and are commonly used as baby oils and within face, body and hand lotions in the cosmetics industry. Other names for mineral oil include, but are not necessarily limited to, paraffin oil, paraffinic oil, lubricating oil, white mineral oil, and white oil.

In one non-limiting embodiment the mineral oil is at least 99 wt % paraffinic. Because of the relatively low content of aromatic compounds, mineral oil has a better environmental profile than other oils. In general, the more refined and less aromatic the mineral oil, the better. In another non-restrictive version, the mineral oil may have a distillation temperature range from about 160 to about 550° C., alternatively have a lower limit of about 200° C. and independently an upper limit of about 480° C.; and a kinematic viscosity at 40° C. from about 1 to about 250 cSt, alternatively a lower limit of about 1.2 independently to an upper limit of about 125 cSt. Specific examples of suitable mineral oils include, but are not necessarily limited to, Benol®, Carnation®, Kaydol®, Semtol®, Hydrobrite® and the like mineral oils available from Crompton Corporation, Escaid®, Exxsol® Isopar® and the like mineral oils available from ExxonMobil Chemical, and similar products from other mineral oil manufacturers. A few non-limiting examples are specified in Table 1. The Escaid 110® and Conoco LVT-200® mineral oils have been well known components of oil-based drilling muds and the oil industry has considerable experience with these products, thus making them an attractive choice. The white mineral oils from Crompton Corporation with their high purity and high volume use within other industries are also an attractive choice.

TABLE 1

Properties of Various Mineral Oils

| Properties | Escaid 110 | Exxsol D110 | Isopar V | Benol | Hydrobrite 200 | Hydrobrite 1000 |
|---|---|---|---|---|---|---|
| Specific Gravity | 0.790-0.810 | 0.780-0.830 | 0.810-0.830 | 0.839-0.855 | 0.845-0.885 | 0.860-0.885 |
| Viscosity @ 40° C. | 1.3-1.9 | — | — | 18.0-20.0 | 39.5-46.0 | 180.0-240.0 |
| Flash Point (° C.) | 77.0 | 105 | 118 | 186 | — | 288 |
| Pour Point (° C.) | — | — | — | −21.0 | −9.0 | −6.0 |
| Distillation Range | | | | | | |
| IBP (° C.) | 200 | 237 | 263 | — | — | — |
| Max DP (° C.) | 248 | 277 | 329 | — | — | — |
| GC Distillation 5% (° C.) | — | — | — | — | >380 | >407 |
| Molecular Wt. | — | — | — | — | — | >480 |
| Aromatic Content | <0.5% | <1.0% | <0.5% | — | — | — |

Note:
Escaid, Exxsol and Isopar are trademarks of ExxonMobil Corporation.
Benol and Hydrobrite are trademarks of Crompton Corporation.

It has been discovered in breaking VES-gelled fluids prepared in monovalent brines (such as 3% KCl brine) that at temperatures below about 180° F. (82° C.) Escaid® 110 works well in breaking VES-gelled fluids, and that at or above about 140° F. (60° C.) Hydrobrite® 200 works well. The use of mineral oils herein is safe, simple and economical. In some cases for reservoir temperatures between about 120° to about 240° F. (about 49° to about 116° C.) a select ratio of two or more mineral oil products, such as 50 wt % Escaid® 110 to 50 wt % Hydrobrite® 200 may be used to achieve controlled, fast and complete break of a VES-gelled fluid.

It has also been discovered that type and amount of salt within the mix water used to prepare the VES fluid (such as 3 wt % KCl, 21 wt % CaCl$_2$, use of natural seawater, and so on) and/or the presence of a VES gel stabilizer (such as VES-STA 1 available from Baker Oil Tools) may affect the activity of a mineral oil in breaking a VES fluid at a given temperature. For example, Escaid® 110 at 5.0 gptg will readily break the 3 wt % KCL based VES fluid at 100° F. (38° C.) over a 5 hour period. Escaid® 110 also has utility as a breaker for a 10.0 ppg CaCl$_2$ (21 wt % CaCl$_2$) based VES fluid at 250° F. (121° C.) when a VES stabilizer (2.0 pptg VES-STA 1) is included.

In one non-limiting embodiment these gel-breaking products work by rearrangement of the VES micelles from rod-shaped or worm-shaped elongated structures to spherical structures. The breaking components described herein may also include the unsaturated fatty acid or polyenoic and monoenoic components of U.S. Patent Application Publication 2006/0211776. In one non-limiting embodiment these unsaturated fatty acids (e.g. oleic, linoleic, linolenic, eicosapentaenoic, etc.) may possibly be used alone, in oils they are commonly found in (flax oil, soybean oil, etc), and can be provided as custom fatty acid blends (such as Fish Oil 18:12TG by Bioriginal Food & Science Corp.), or used together with the mineral oils herein. In another non-limiting embodiment, natural saturated hydrocarbons such as terpenes (e.g. pinene, d-limonene, etc.), saturated fatty acids (e.g. lauric acid, palmitic acid, stearic acid, etc. from plant, fish and/or animal origins) and the like may possibly be used together with or alternatively to the mineral oils herein. In some cases it is preferred that the plant or fish oil be high in polyunsaturated fatty acids, such as the use of flax oil, salmon oil, and the like. The plant and fish oils may be refined, blended and the like to have the desired polyunsaturated fatty acid composition modified for the compositions and methods herein. Other refinery distillates may potentially be used in addition to or alternatively to the mineral oils described herein, as may be hydrocarbon condensation products. Additionally, synthetic mineral oils, such as hydrogenated polyalphaolefins, and other synthetically derived saturated hydrocarbons may be of utility to practice the methods herein.

In one non-limiting embodiment, the breaking or viscosity reduction is triggered or initiated by heat. These mineral, plant, and animal oils will slowly, upon heating, break or reduce the viscosity of the VES gel with the addition of or in the absence of any other viscosity reducing agent. The amount of internal breaker (mineral oil, e.g.), needed to break a VES-gelled fluid appears temperature dependent, with less needed as the fluid temperature increases. For mineral oil the kinematic viscosity, molecular weight distribution, and amount of impurities (such as aromatics, olefins, and the like) also appear to influence the rate in which a mineral oil will break a VES-gelled fluid at a given temperature. For unsaturated fatty acid oils the type and amount of unsaturation (i.e. double carbon bonds) appears to be the major influence on the rate at which the fatty acid oil will break the VES-gelled fluid at a given temperature. Once a fluid is completely broken at an elevated temperature and cooled to room temperature a degree of viscosity reheal may occur but in most cases no rehealing is expected. Strangely enough all of the listed oils will allow initial VES to gel but then later act as controllable breakers with little to no fluid reheal upon breaking. In the case of mineral oils, one non-limiting explanation may be because the mineral oil is so hydrophobic and its molecular weight is so high that the initial amount available to the VES surfactant upon VES micelle formation is small but at reservoir temperature over time the mineral oil will break up and contaminate the VES micelle. The effective amount of mineral oil, plant oil and/or fish oil ranges from about 0.1 to about 15 gptg based on the total fluid, in another non-limiting embodiment from a lower limit of about 0.5. Independently the upper limit of the range may be about 10 gptg based on the total fluid. (It will be appreciated that units of gallon per thousand gallons (gptg) are readily converted to SI units of the same value as, e.g. liters per thousand liters, $m^3/1000\ m^3$ etc.

Controlled viscosity reduction rates can be achieved at a temperature of from about 70° F. to about 400° F. (about 21 to about 204° C.), and alternatively at a temperature of from about 100° F. independently to an upper end of the range of about 280° F. (about 38 to about 138° C.), and in another non-limiting embodiment independently up to about 300° F. (149° C.). In one non-limiting embodiment, the fluid designer would craft the fluid system in such a way that the VES gel would break at or near the formation temperature after acidizing and fracturing was accomplished.

In one non-limiting embodiment, fluid internal breaker design would be based primarily on formation temperature, i.e. the temperature the fluid will be heated to naturally in the formation once the acidizing treatment is over. Fluid design may take into account the expected cool down of the fluid during a treatment. In many cases the treating fluid may only experience actual reservoir temperature for 5% to 25% of the job time, and close to 50% of the fluid is never exposed to the original reservoir temperature because of the cool down of the reservoir by the initial treating fluid placed into the reservoir. It is because a portion of the treating fluid will not see or be exposed to the original reservoir temperature that a cooler temperature is selected that will represent what the fluid will probably see or contact, and thus laboratory break tests may be run at this cooler temperature. There would generally be no additional temperature or heating the VES fluid would see or experience other than original reservoir temperature.

The use of the disclosed breaker system is ideal for controlling viscosity reduction of VES based treating fluids. The breaking system may also be used for breaking gravel pack fluids, fracturing fluids, acidizing or near-wellbore clean-up diverter fluids, and loss circulation pill fluids composed of VES. The breaker system may additionally work for foamed fluid applications (hydraulic fracturing, acidizing, and the like), where $N_2$ or $CO_2$ gas is used for the gas phase. This VES breaking method is a significant improvement in that it gives breaking rates for VES based fluids that the industry is accustomed to with conventional polymer based fracturing fluids, such as borate crosslinked guar. Potentially more importantly, the use of this internal breaker system in combination with external downhole breaking conditions should help assure and improve hydrocarbon production compared to prior art that uses only external mechanisms to break the VES fluid for effective and complete VES fluid cleanup after a treatment.

In one non-limiting embodiment of the invention, the compositions herein will degrade the gel created by a VES in an aqueous fluid, by disaggregation or rearrangement of the VES micellar structure. However, the inventors do necessarily not want to be limited to any particular mechanism.

It is sometimes difficult to specify with accuracy in advance the amount of the various breaking components that should be added to a particular aqueous fluid gelled with viscoelastic surfactants to sufficiently or fully break the gel, in general. For instance, a number of factors affect this proportion, including but not necessarily limited to, the particular VES used to gel the fluid; the particular mineral, plant, and/or fish oil used; the temperature of the fluid; the downhole pressure of the fluid, the starting pH of the fluid; the type and amount of salts; and the complex interaction of these various factors. Nevertheless, in order to give an approximate feel for the proportions of the various breaking components to be used in the method of the invention, approximate ranges will be provided. In an alternative, non-limiting embodiment the amount of mineral oil that may be effective in the invention may range from about 5 to about 25,000 ppm, based on the total amount of the fluid. In another non-restrictive version of the invention, the amount of mineral oil may range from a lower end of about 50 independently to an upper end of about 12,000 ppm.

Any suitable mixing apparatus may be used for this procedure. In the case of batch mixing, the dicarboxylic acid, the VES gelling agent, the internal breaker and the aqueous fluid are blended for a period of time. The mineral, vegetable, and/or animal oil may be added during batch mixing or on the fly during the treatment. The preferred method is batch mixing all additives together prior to being pumped downhole. The VES typically will be added to the aqueous fluid after the dicarboxylic acid addition, but may be added on the fly during the treatment. Some initial gelling of the VES prior to the dicarboxylic acid encountering carbonate in the formation may be acceptable, although in most cases this should not occur due to the initial pH of the fluid being too low, typically less than 4.0 pH. The VES that is useful in the present invention can be any of the VES systems that are familiar to those in the well service industry, and may include, but are not limited to, amines, amine salts, quaternary ammonium salts, amidoamine oxides, amine oxides, mixtures thereof and the like. Suitable amines, amine salts, quaternary ammonium salts, amidoamine oxides, and other surfactants are described in U.S. Pat. Nos. 5,964,295; 5,979,555; and 6,239,183, incorporated herein by reference in their entirety.

Viscoelastic surfactants improve the treating fluid performance through the use of a polymer-free system. These systems, compared to polymeric based fluids, can offer improved viscosity breaking, higher sand trans-port capability (where appropriate), are in many cases more easily recovered after treatment than polymers, and are relatively non-damaging to the reservoir with appropriate contact with sufficient quantity of reservoir hydrocarbons, such as crude oil and condensate. The systems are also more easily mixed "on the fly" in field operations and do not require numerous co-additives in the fluid system, as do some prior systems.

The viscoelastic surfactants suitable for use herein include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^-$ may have the following structure (I):

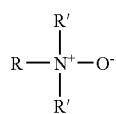

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amidoamine oxide gelling agent is Akzo Nobel's Aromox® APA-T formulation, which should be understood as a dipropylamine oxide since both R' groups are propyl.

Materials sold under U.S. Pat. No. 5,964,295 include ClearFRAC™, which may also comprise greater than 10% of a glycol. One preferred VES is an amine oxide. As noted, a particularly preferred amine oxide is APA-T, sold by Baker Oil Tools as SurFRAQ™ VES. SurFRAQ is a VES liquid product that is 50% APA-T and greater than 40% propylene glycol. These viscoelastic surfactants are capable of gelling aqueous solutions to form a gelled base fluid. The additives of this invention are used to prepare a VES system sold by Baker Oil Tools as DiamondFRAQ™. Diamond FRAQ™ with its assured breaking technology overcomes reliance on external reservoir conditions in order to break, as compared with products such as ClearFRAC™.

The methods and compositions herein also cover commonly known materials as Aromox® APA-T manufactured by Akzo Nobel and other known viscoelastic surfactant gelling agents common to stimulation treatment of subterranean formations.

The amount of VES included in the acid treating fluid depends on at least two factors. One involves generating enough viscosity to control the rate of fluid leak off into the pores of the reservoir or fracture, and the second involves creating a viscosity high enough to divert the fresh or unused acid in the fluid during the fluid introduction or injecting step, in the non-limiting case of a treating fluid. Thus, depending on the application, the VES is added to the aqueous fluid in concentrations ranging from about 0.5 to 25% by volume, alternatively up to about 12 vol % of the total aqueous fluid (from about 5 to 120 gptg). In another non-limiting embodiment, the range for the present formulations is from about 1.0 to about 6.0% by volume VES product. In an alternate, non-restrictive form of the invention, the amount of VES ranges from a lower limit of about 2 independently to an upper limit of about 10 volume %.

It is expected that the breaking compositions of this invention can be used to reduce the viscosity of a VES-gelled aqueous fluid regardless of how the VES-gelled fluid is ultimately utilized. For instance, the viscosity breaking compositions could be used in all VES applications including, but not limited to, VES-gelled friction reducers, VES viscosifiers for loss circulation pills, fracturing fluids (including foamed fracturing fluids), gravel pack fluids, viscosifiers used as diverters in acidizing (including foam diverters), VES viscosifiers used to clean up drilling mud filter cake, remedial clean-up of fluids after a VES treatment (post-VES treatment) in regular or foamed fluid forms (i.e. the fluids may be "energized") with or the gas phase of foam being $N_2$ or $CO_2$, and the like.

A value of the compositions and methods herein is that an acid fracturing or other treating fluid may be designed to have enhanced breaking characteristics. That is, fluid breaking is no longer solely dependant on external reservoir conditions for viscosity break and is controllable: the rate of viscosity reduction, if complete break is achieved/occurs throughout the reservoir interval. Importantly, better clean-up of the VES fluid from the formation and wellbore can be achieved thereby. Better clean-up of the VES directly influences the success of the fracture treatment, which is an enhancement of the well's hydrocarbon productivity. VES fluid clean-up limitations and failures of the past can now be overcome or improved by the use of fluid compositions disclosed herein.

In order to practice the method of the invention, an aqueous treating fluid, as a non-limiting example, is first prepared by blending a dicarboxylic acid, VES gelling agent, and internal breaker into an aqueous fluid. The aqueous fluid could be, for example, water, brine, seawater, or mixtures thereof. Any suitable mixing apparatus may be used for this procedure. In one non-limiting embodiment, in the case of batch mixing, the dicarboxylic acid, VES gelling agent, internal breaker and the aqueous fluid are blended for a short period of time sufficient to mix the components together, such as for 15 minutes to 1 hour. In another non-limiting embodiment all of the dicarboxylic acid, VES gelling agent and the internal breaking composition may be added to the aqueous fluid on the fly, during a treatment. Propping agents are typically added on the fly to the base fluid, if a fracturing fluid is intended.

The base fluid can also contain other conventional additives common to the well service industry such as water wetting surfactants, non-emulsifiers, scale inhibitors, and the like. As noted herein, the base fluid can also contain other non-conventional additives which can contribute to the breaking action of the VES fluid, and which are added for that purpose in one non-restrictive embodiment.

Any or all of the above mineral, vegetable, and animal oils may be provided in an extended release form such as encapsulation by polymer or otherwise, pelletization with binder compounds, absorbed or some other method of layering on a microscopic particle or porous substrate, and/or a combination thereof. Specifically, the mineral, plant and/or fish oils may be micro- and/or macro-encapsulated to permit slow or timed release thereof. In non-limiting examples, the coating material may slowly dissolve or be removed by any conventional mechanism, or the coating could have very small holes or perforations therein for the mineral oils within to diffuse through slowly. For instance, a mixture of fish gelatin and gum acacia encapsulation coating available from ISP Hallcrest, specifically Captivates® liquid encapsulation technology, can be used to encapsulate mineral, plant, fish, synthetic and other saturated oils of this invention. Also, polymer encapsulation coatings such as used in fertilizer technology available from Scotts Company, specifically POLY-S® product coating technology, or polymer encapsulation coating technology from Fritz Industries could possibly be adapted to the methods of this invention. The mineral oils could also be absorbed onto zeolites, such as Zeolite A, Zeolite 13X, Zeolite DB-2 (available from PQ Corporation, Valley Forge, Pa.) or Zeolites Na-SKS5, Na-SKS6, Na-SKS7, Na-SKS9, Na-SKS10, and Na-SKS13, (available from Hoechst Aktiengesellschaft, now an affiliate of Aventis S.A.), and other porous solid substrates such as MICROSPONGE™ (available from Advanced Polymer Systems, Redwood, Calif.) and cationic exchange materials such as bentonite clay or placed within microscopic particles such as carbon nanotubes or buckminster fullerenes. Further, the mineral oils may be both absorbed into and onto porous or other substrates and then encapsulated or coated, as described above.

In a typical acidizing operation, the treating fluid of the invention is pumped at a rate sufficient to effectively contact the formation. A typical acidizing treatment would be conducted by mixing a 20.0 to 60.0 gallon/1000 gal water (60.0 liters/1000 liters) amine oxide VES, such as SurFRAQ, in a 2% (w/v) (166 lb/1000 gal, 19.9 kg/m$^3$) KCl solution at a pH ranging from about 2 to about 6, largely set by the dicarboxylic acid proportion. The breaking component may be added during the VES addition or after the VES addition using appropriate mixing and metering equipment, or if needed in a separate step after the treating operation is complete, or combinations of these procedures.

In one embodiment of the invention, the methods and compositions herein are practiced in the absence of gel-forming polymers and/or gels or aqueous fluids having their viscosities enhanced by polymers. However, combination use with polymers and polymer breakers may also be of utility. For instance, polymers may also be added to the VES fluid of this invention for fluid loss control purposes. Types of polymers that may serve as fluid loss control agents include, but are not necessarily limited to, various starches, modified starches, polyvinyl acetates, polylactic acids, guar and other polysaccharides, hydroxyethylcellulose and other derivatized celluloses, gelatins, and the like.

The present invention will be explained in further detail in the following non-limiting Examples that are only designed to additionally illustrate the invention but not narrow the scope thereof.

General Procedure for Examples 1-4

To a blender were added tap water, HTO acid, internal breaker (mineral oil or fish oil), followed by 4 vol %-viscoelastic surfactant (WG-3L—Aromox® APA-T available from Akzo Nobel). The blender was used to mix the components on a very slow speed, to prevent foaming, for about 30 minutes to form a 10% by HTO acid with 4% by VES and internal breaker fluid. At very slow speed blending, carbonate powder was slowly added to react with the acid. The pH and viscosity of the fluid were measured with a pH meter and a Fann-35 viscometer and recorded. After the acid is spent, the sample was loaded in a Grace 5500 rheometer to measure the viscosity vs shear rate or time at desired temperatures. Since a goal of the research was to find a relatively rapid gel breaking composition, samples were only observed for 5 hours or less, as indicated.

Example 1

Figure 4:
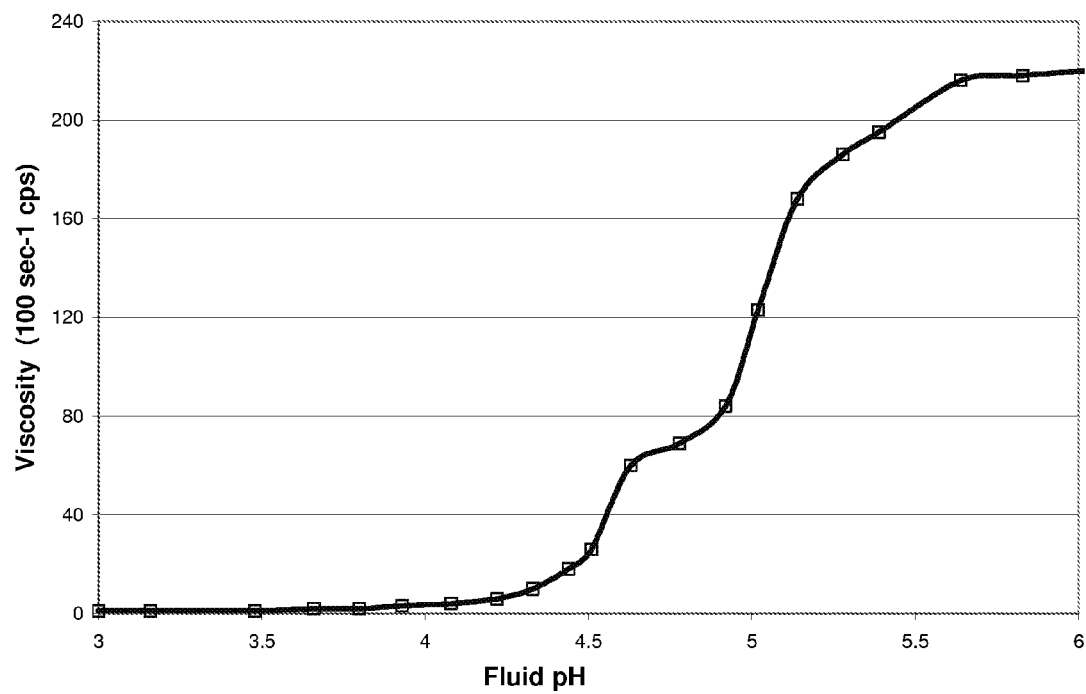
FIG. 4 is a graph showing that the viscosity of aqueous fluids containing a VES gelling agent and 10% of a dicarboxylic acid (HTO™ acid), either with or without an internal breaker, increases with increasing pH as the acid reacts with carbonate.

Shown in FIG. 4 are the results of plotting viscosity as a function of fluid pH for two aqueous fluids gelled with 4% of an amidoamine oxide VES containing 10% HTO acid, one with an internal mineral oil breaker 3 gptg herein, and one without. Both fluids had identical curves and indicate that viscosity increases with increasing pH. This indicates that these fluids would start out with water-like viscosity, but when the acid reacts with the carbonate, is neutralized and the pH rises, the viscosity of the fluid will increase. This data also indicates that presence of internal breaker, such as mineral oil, did not influence or prevent the VES gelling agent from yielding fluid viscosity upon acid spending. That is, presence of the mineral oil did not initially prevent or weaken the formation of viscous rod-like micelles by the VES gelling agent. This is a novel and unique phenomena, and is also synergistic. That is, what is believed novel and synergistic is the ability of a single, unitary fluid to initially have water like acid viscosity but as the acid in the fluid is spent the fluid viscosity increases and thereby then acts to divert the fresh trailing acid fluid. Once the VES viscosity is generated upon acid spending, the internal breaker is then initiated and starts to slowly and controllably work to break the VES viscosity The viscosity was measured at 100 sec-1 shear rate at a room temperature of 74° F. (24° C.).

Example 2

Figure 5:
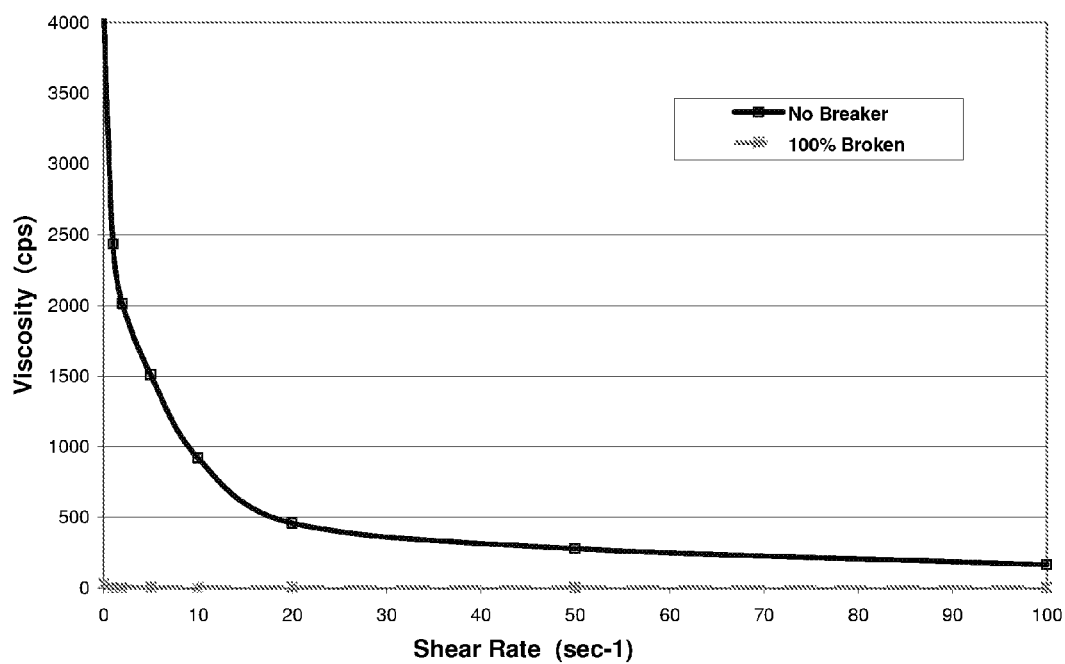
FIG. 5 is a graph of showing the viscosities of fluids gelled with a VES after the dicarboxylic acid (HTO™ acid) is spent without and with an internal breaker included at 140° F. (60° C.), as a function of shear rate.

Results showing the effect of using the mineral oil breaker on a VES-gelled acid-spent fluid at 140° F. (60° C.) are presented in FIG. 5 plotting viscosity as a function of shear rate. It is readily seen that when no breaker is present, the viscosity is maintained at 4000 cps at very low shear rates, but when a breaker is present and has been fully activated (100% broken), the spent-acid VES-gelled fluid viscosity is close to zero, or water-like consistency at low shear rates.

Example 3

Figure 6:
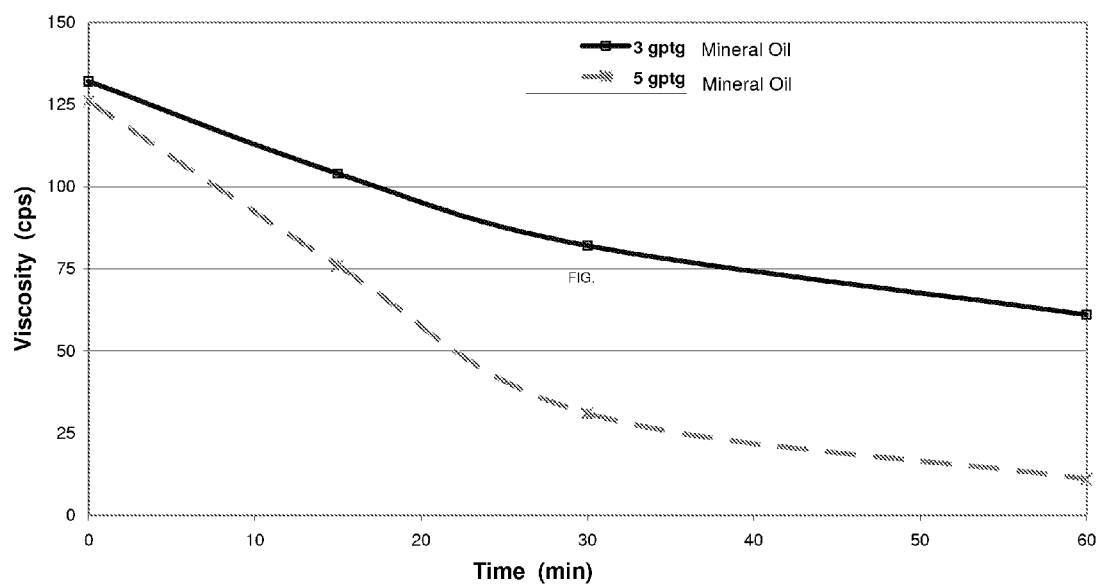
FIG. 6 is a graph of viscosity as a function of time showing the effect of using an increasing amount of mineral oil internal breaker in a fluid initially gelled with VES having spent dicarboxylic acid (HTO™ acid) at 160° F. (71° C.) and a 100 1/s shear rate showing increased reduction with increasing amount of breaker.

FIG. 6 is a graph of viscosity as a function of time for two VES-gelled aqueous fluids containing spent HTO acid using two different amounts of mineral oil type internal breaker measured at 160° F. (71° C.) and a shear rate of 100 s$^{-1}$. It may be readily seen that the viscosity is reduced over time for both fluids, and that the viscosity of the fluid having 5 gptg mineral oil reduces faster than the one containing 3 gptg mineral oil.

Example 4

Figure 7:
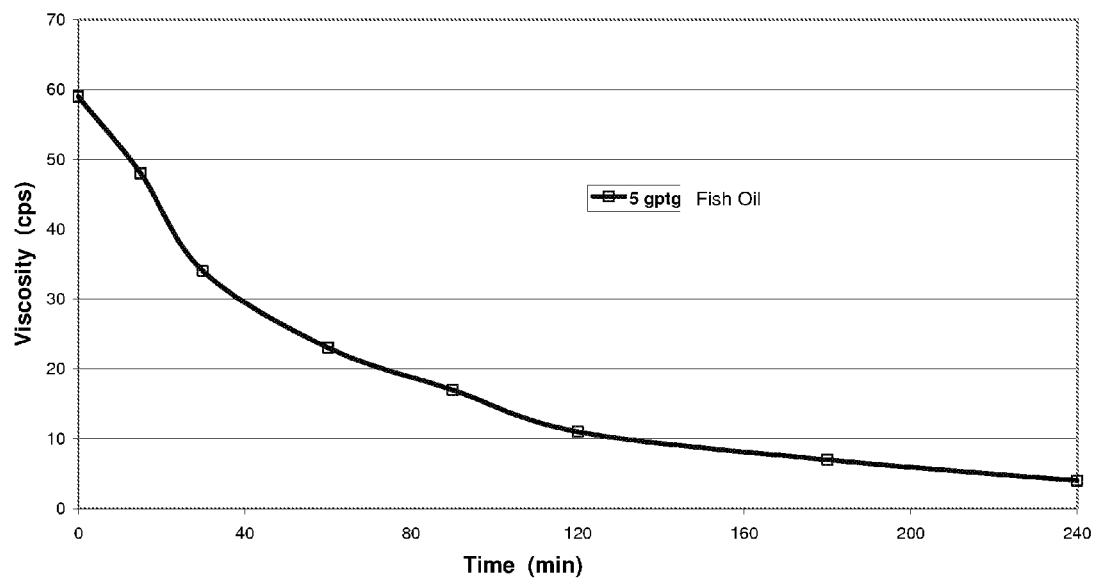
FIG. 7 is a graph of viscosity of a fluid initially gelled with a VES having spent dicarboxylic acid (HTO™ acid) at 160° F. (71° C.) and a 100 1/s shear rate containing a fish oil internal breaker that is high in polyunsaturated fatty acids demonstrating effective viscosity reduction.

FIG. 7 is a graph of viscosity as a function of time for a VES-gelled aqueous fluid containing spent HTO acid using a different internal breaker from Example 3. In this Example, 5 gptg fish oil breaker was used. The fish oil used was Bioriginal Fish Oil 18:12TG, which is about 18% EPA (eicosapentaenoic acid=C22:5—five double carbon bonds) and 12% DHA (docosahexaenoic acid=C22:6—six double carbon bonds) highly unsaturated fatty acids. The fluid was again measured at 160° F. (71° C.) and a shear rate of 100 s$^{-1}$. It is apparent that the viscosity is reduced over time for the fluids, as desired for the methods herein.

Examples 5-6

Figure 8:
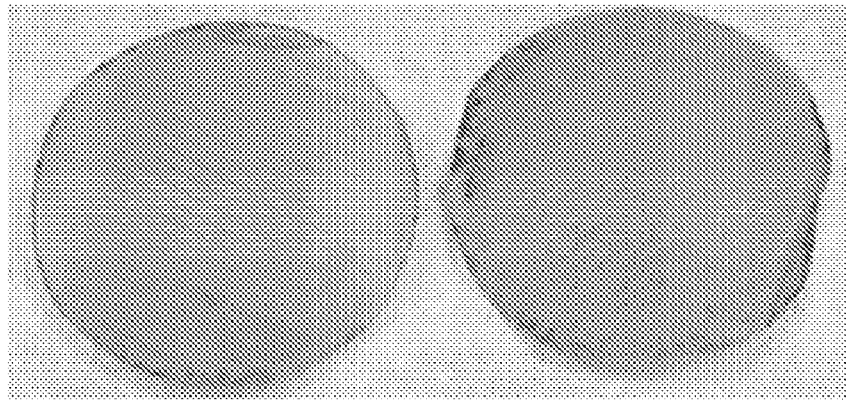
FIG. 8 is a photograph of 400 mesh (38 micron) stainless steel screens after pumping 1000 ml 10% dicarboxylic acid (HTO™ acid) through them at 10 ml/min and 121° C. (250° F.)
Figure 9:
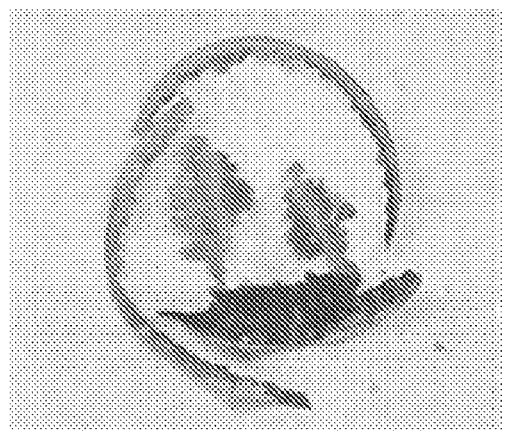
FIG. 9 is a photograph of a 400 mesh (38 micron) stainless steel screen after pumping 1000 ml 10% acetic acid through it at 10 ml/min and 121° C. (250° F.) showing advanced corrosion as compared with the screens of FIG. 8.

FIG. 8 is a photograph of 400 mesh (38 micron) stainless steel screens after pumping 1000 ml of 10% HTO acid through them at 10 ml/min and 121° C. (250° F.). It may be seen that both screens are intact. This situation is in contrast to that presented in the photograph of FIG. 9 where 1000 ml of 10% acetic acid was pumped at 10 ml/min and 121° C. (250° F.) through an identical screen and it may be seen that the screen is considerably eroded. These photographs vividly demonstrate that the HTO acid is much less damaging to screens (and by extension other equipment) than commonly used acetic acid.

As may be seen, the method of gel breaking described herein is simple, effective, safe, and highly cost-effective. A method is provided for breaking the viscosity of aqueous acidizing treatment fluids gelled with viscoelastic surfactants (VESs). Compositions and methods are also furnished herein for breaking VES-surfactant fluids controllably, completely and relatively quickly.

Compositions and methods are also disclosed herein for breaking VES-surfactant fluids where contact with reservoir fluids' external breaking mechanism is not required, although in some embodiments heat from the reservoir may help the breaking process. Compositions and methods are additionally provided for breaking VES-surfactant fluids where the breaking additive is in a phase internal to the VES-surfactant fluid. Further, methods and VES fluid compositions are described herein for breaking the viscosity of aqueous fluids gelled with viscoelastic surfactants using readily available materials at relatively inexpensive concentrations.

In the foregoing specification, the invention has been described with reference to specific embodiments thereof, and has been demonstrated as effective in providing methods and compositions for using VES-gelled aqueous fluids to acidize subterranean formations where the fluid has an internal breaker mechanism. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of viscoelastic surfactants, mineral oils, organic acids and other components falling within the claimed parameters, but not specifically identified or tried in a particular composition or fluid, are anticipated to be within the scope of this invention. Further, the aqueous VES-gelled fluids containing organic acids herein may be used as VES fracturing fluid in acid fracturing treatments.

What is claimed is:

1. A method for treating a subterranean formation comprising:
introducing a viscoelastic surfactant gelled fluid into a subterranean formation, where the viscoelastic surfactant gelled fluid comprises:
water;
at least one viscoelastic surfactant (VES) in an amount effective to increase the viscosity of the water, where the VES is selected from the group consisting of nonionic, cationic, and zwitterionic surfactants, where the zwitterionic surfactants are selected from the group consisting of dihydroxyl alkyl glycinate, alkyl ampho acetate or propionate, and alkylimino mono- or di-propionates;
at least one internal breaker selected from the group consisting of mineral oils, plant oils, fish oils, hydrogenated polyalphaolefin oils, saturated fatty acids, unsaturated fatty acids and combinations thereof; and
at least one dicarboxylic acid;
treating the subterranean formation with the dicarboxylic acid; and
reducing the viscosity of the viscoelastic surfactant gelled fluid with the breaker.

2. The method of claim 1 where the subterranean formation contains carbonate, where the viscoelastic surfactant gelled fluid has a pH and where the treating further comprises:
contacting the carbonate with the viscoelastic surfactant gelled fluid;
reacting the at least one dicarboxylic acid with the carbonate in the formation thereby increasing the fluid pH causing at least portions of the fluid to increase the local viscosity thereof; and
diverting unreacted dicarboxylic acid to contact further carbonate via the increased local viscosity of the fluid.

3. The method of claim 1 further comprising:
heating the fluid to a temperature effective to cause the breaker to reduce the viscosity of the gelled aqueous fluid.

4. The method of claim 3 where the effective temperature ranges from about 100 to about 400° F. (about 38 to about 204° C.).

5. The method of claim 1 where the internal breaker is a mineral oil and is at least about 99 wt % paraffin.

6. The method of claim 1 where the internal breaker is a mineral oil and has a distillation temperature in the range from about 160 to about 550° C., and a kinematic viscosity at 40° C. of from about 1 to about 250 cSt.

7. The method of claim 1 where the internal breaker is selected from the group consisting of a mineral oil, a plant oil, a fish oil and mixtures thereof, and the effective amount of the internal breaker in the fluid ranges from about 0.1 to about 15 gptg based on the total fluid.

8. The method of claim 1 where the only viscosity reducing agent added is the internal breaker.

9. The method of claim 1 where the internal breaker is present in an oil-soluble internal phase of the aqueous fluid.

10. The method of claim 1 where the at least one dicarboxylic acid has a formula weight of 175 or less.

11. The method of claim 1 where the at least one dicarboxylic acid is selected from the group consisting of succinic acid, glutaric acid, adipic acid, and mixtures thereof.

12. The method of claim 1 where the viscoelastic surfactant gelled fluid further comprises hydrofluoric acid or a substance that hydrolyzes to hydrofluoric acid.

13. A method for treating a subterranean formation comprising:
introducing a viscoelastic surfactant gelled fluid into a subterranean formation containing carbonate, where the viscoelastic surfactant gelled fluid has a pH and comprises:
water;
at least one viscoelastic surfactant (VES) in an amount effective to increase the viscosity of the water, where the VES is selected from the group consisting of non-ionic, cationic, and zwitterionic surfactants, where the zwitterionic surfactants are selected from the group consisting of dihydroxyl alkyl glycinate, alkyl ampho acetate or propionate, and alkylimino mono- or di-propionates;
at least one internal breaker selected from the group consisting of mineral oils, plant oils, fish oils, hydrogenated polyalphaolefin oils, saturated fatty acids, unsaturated fatty acids and combinations thereof; and
at least one dicarboxylic acid having a formula weight of 175 or less;
treating the subterranean formation with the dicarboxylic acid comprising:
contacting the carbonate with the viscoelastic surfactant gelled fluid;
reacting the dicarboxylic acid with the carbonate in the formation thereby increasing the fluid pH causing portions of the fluid to increasing the local viscosity thereof; and
diverting unreacted dicarboxylic acid to contact further carbonate via the increased local viscosity of the fluid; and
reducing the viscosity of the viscoelastic surfactant gelled fluid with the breaker.

14. The method of claim 13 further comprising:
heating the fluid to a temperature between about 100 to about 400° F. (about 38 to about 204° C.) causing the breaker to reduce the viscosity of the gelled aqueous fluid.

15. The method of claim 13 where the internal breaker is a mineral oil and is at least about 99 wt % paraffin.

16. The method of claim 13 where the internal breaker is a mineral oil and has a distillation temperature in the range from about 160 to about 550° C., and a kinematic viscosity at 40° C. of from about 1 to about 250 cSt.

17. The method of claim 13 where the internal breaker is selected from the group consisting of a mineral oil, a plant oil, a fish oil and mixtures thereof, and the effective amount of the internal breaker in the fluid ranges from about 0.1 to about 15 gptg based on the total fluid.

18. The method of claim 13 where the only viscosity reducing agent added is the internal breaker.

19. The method of claim 13 where the internal breaker is present in an oil-soluble internal phase of the aqueous fluid.

20. The method of claim 13 where the dicarboxylic acid is selected from the group consisting of succinic acid, glutaric acid, adipic acid, and mixtures thereof.

21. The method of claim 13 where the viscoelastic surfactant gelled fluid further comprises hydrofluoric acid or a substance that hydrolyzes to hydrofluoric acid.

22. A viscoelastic surfactant gelled fluid comprising:
water;
at least one viscoelastic surfactant (VES) in an amount effective to increase the viscosity of the water, where the VES is selected from the group consisting of non-ionic, cationic, and zwitterionic surfactants, where the zwitterionic surfactants are selected from the group consisting of dihydroxyl alkyl glycinate, alkyl ampho acetate or propionate, and alkylimino mono- or di-propionates;
at least one internal breaker selected from the group consisting of mineral oils, plant oils, fish oils, hydrogenated polyalphaolefin oils, saturated fatty acids, unsaturated fatty acids and combinations thereof; and
at least one dicarboxylic acid.

23. The viscoelastic surfactant gelled fluid of claim 22 where the internal breaker is a mineral oil and is at least about 99 wt % paraffin.

24. The viscoelastic surfactant gelled fluid of claim 22 where the internal breaker is a mineral oil and has a distillation temperature in the range from about 160 to about 550° C., and a kinematic viscosity at 40° C. of from about 1 to about 250 cSt.

25. The viscoelastic surfactant gelled fluid of claim 22 where the internal breaker is selected from the group consisting of a mineral oil, a plant oil, a fish oil and mixtures thereof, and the effective amount of the internal breaker in the fluid ranges from about 0.1 to about 15 gptg based on the total fluid.

26. The viscoelastic surfactant gelled fluid of claim 22 where the only viscosity reducing agent added is the internal breaker.

27. The viscoelastic surfactant gelled fluid of claim 22 where the internal breaker is present in an oil-soluble internal phase of the aqueous fluid.

28. The viscoelastic surfactant gelled fluid of claim 22 where the at least one dicarboxylic acid has a formula weight of 175 or less.

29. The viscoelastic surfactant gelled fluid of claim 22 where the at least one dicarboxylic acid is selected from the group consisting of succinic acid, glutaric acid, adipic acid, and mixtures thereof.

30. The viscoelastic surfactant gelled fluid of claim 22 further comprising hydrofluoric acid or a substance that hydrolyzes to hydrofluoric acid.

31. The viscoelastic surfactant gelled fluid of claim 22 where the fluid consists essentially of water, the at least one VES, the at least one internal breaker and the at least one dicarboxylic acid.

32. A viscoelastic surfactant gelled fluid comprising:
water;
at least one amidoamine oxide viscoelastic surfactant (VES) in an amount effective to increase the viscosity of the water;
at least one internal breaker selected from the group consisting of mineral oils, plant oils, fish oils, hydrogenated polyalphaolefin oils, saturated fatty acids, unsaturated fatty acids and combinations thereof, where the internal breaker acts to reduce the viscosity of the fluid when the temperature of the fluid ranges between about 100 to about 400° F. (about 38 to about 204° C.); and
at least one dicarboxylic acid having a formula weight of 175 or less.

33. The viscoelastic surfactant gelled fluid of claim 32 where the internal breaker is a mineral oil and is at least about 99 wt % paraffin.

34. The viscoelastic surfactant gelled fluid of claim 32 where the internal breaker is a mineral oil and has a distillation temperature in the range from about 160 to about 550° C., and a kinematic viscosity at 40° C. of from about 1 to about 250 cSt.

35. The viscoelastic surfactant gelled fluid of claim 32 where the internal breaker is selected from the group consisting of a mineral oil, a plant oil, a fish oil and mixtures thereof, and the effective amount of the internal breaker in the fluid ranges from about 0.1 to about 15 gptg based on the total fluid.

36. The viscoelastic surfactant gelled fluid of claim 32 where the only viscosity reducing agent added is the internal breaker.

37. The viscoelastic surfactant gelled fluid of claim 32 where the internal breaker is present in an oil-soluble internal phase of the aqueous fluid.

38. The viscoelastic surfactant gelled fluid of claim 32 where the at least one dicarboxylic acid is selected from the group consisting of succinic acid, glutaric acid, adipic acid, and mixtures thereof.

39. The viscoelastic surfactant gelled fluid of claim 32 further comprising hydrofluoric acid or a substance that hydrolyzes to hydrofluoric acid.

* * * * *